United States Patent [19]

Rowe

[11] Patent Number: 5,471,831
[45] Date of Patent: Dec. 5, 1995

[54] GAS TURBINE ENGINE WATER INGESTION COMPENSATION SYSTEM

[75] Inventor: Arthur L. Rowe, Derby, England

[73] Assignee: Rolls-Royce plc, London, England

[21] Appl. No.: 197,830

[22] Filed: Feb. 17, 1994

[30] Foreign Application Priority Data

Mar. 16, 1993 [GB] United Kingdom ............... 9305414

[51] Int. Cl.$^6$ ........................................... F02C 9/28
[52] U.S. Cl. ................... 60/39.03; 60/39.091; 60/39.281
[58] Field of Search .................... 60/39.03, 39.091, 60/39.27, 39.281

[56] References Cited

U.S. PATENT DOCUMENTS 3,925,980  12/1975  McCombs .
4,060,980  12/1977  Elsaesser ........................ 60/39.27
4,603,546  8/1986   Collins .
5,265,414  11/1993  Mouton ........................... 60/39.091

FOREIGN PATENT DOCUMENTS 1580503  12/1980  United Kingdom .

*Primary Examiner*—Louis J. Casaregola
*Attorney, Agent, or Firm*—Cushman Darby & Cushman

[57] ABSTRACT

A ducted fan gas turbine engine is provided with a plurality of sensors which detect the presence of liquid water in air exhausted from the high pressure compressor of the engine into its combustion system. In the event that liquid water is detected, the fuel flow to the combustion system is increased to cause the high pressure compressor to rotate faster and thereby vaporize the liquid water. Such liquid water can be present in the air exhausted from the high pressure compressor when the engine is operating in very heavy rain and can adversely affect normal engine operation.

9 Claims, 2 Drawing Sheets

GAS TURBINE ENGINE WATER INGESTION COMPENSATION SYSTEM

FIELD OF THE INVENTION

This invention relates to a method of operating a gas turbine engine during the ingestion of water by that engine and to a gas turbine engine which is capable of being so operated.

BACKGROUND OF THE INVENTION

Aircraft mounted gas turbine engines are usually capable of operating satisfactorily in rain, hail or snow. Water ingested by the engines under these conditions is usually vaporized during its passage through the engine's compressors. Consequently air which eventually enters the engine's combustion system is generally free of significant quantities of liquid water.

There are, however, circumstances in which ingested water can prejudice the effective operation of the engines. The most common of these circumstances is when the engines are passing through very heavy rain, hail or snow at minimum idle, that is at their lowest flight power setting. This typically occurs during the descent of the aircraft powered by the engines prior to its landing. Under these circumstances, it is well known that the ingested water can have up to three adverse effects upon engine operation:

(a) The engine can progressively run down until it eventually stops. This is a characteristic of older design engines having hydromechanical fuel flow control mechanisms although not of more modern engines having electronic control mechanisms.

(b) The engine can suffer from a flameout. Thus the presence of liquid water within the engine combustor together with the low combustion pressures and temperatures associated with minimum idle conditions result in combustion being extinguished.

(c) The high pressure compressor of the engine can surge and thereby cease operating. This arises as a result of the working line of the compressor being raised by water evaporation and the extra work done by the compressor on the water.

SUMMARY OF THE INVENTION

It is an object of the present invention to provide a method of operating a gas turbine engine during the ingestion of water by that engine in which such adverse effects are substantially avoided.

It is a further object of the present invention to provide a gas turbine engine in which such adverse effects are substantially avoided.

According to the present invention, a method of operating a gas turbine engine which includes an air compression system and a combustion system during the ingestion of water-laden air by said air compression system comprises the steps of detecting the presence of liquid water in air exhausted from said compression system and at least increasing the fuel supply to said combustion system in accordance with the detection of such liquid water to increase the rotational speed of said engine, and hence of said compression system to an extent sufficient to ensure that the majority of liquid water within said compression system is vaporized thereby prior to the exhaustion of said water laden air from said compression system into said combustion system.

According to a further aspect of the present invention, a gas turbine engine includes a compression system, a combustion system and means adapted to detect the presence of liquid water in air exhausted from said compression system into said combustion system, control means being provided to control the flow of fuel to said combustion system in accordance with the output of said detector means so that in the event of liquid water being so detected, the fuel supply to said combustion system is increased to increase the rotational speed of said engine and hence of said compression system to an extent sufficient to ensure that the majority of the liquid water within said compression system is vaporized thereby prior to the exhaustion of said water laden air from said compression system into said combustion system.

The present invention will now be described, by way of example, with reference to the accompanying drawings in which:

DETAILED DESCRIPTION OF THE INVENTION

Figure 1:
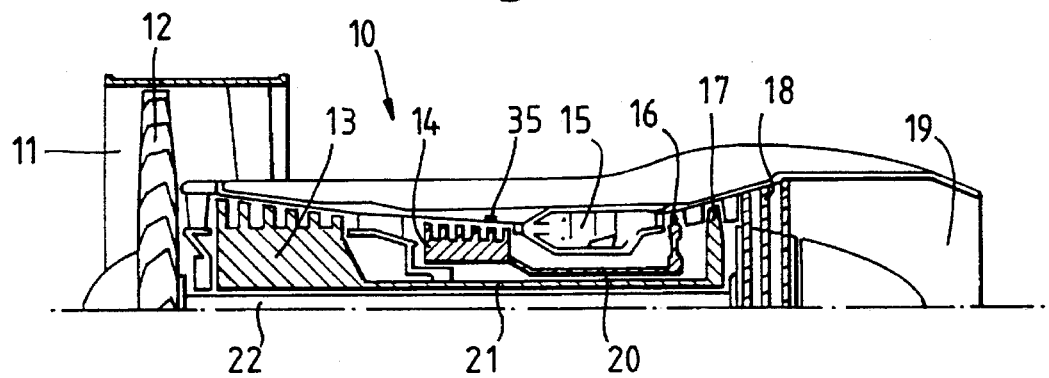
FIG. 1 is a sectioned schematic view of the upper half of a ducted fan gas turbine engine in accordance with the present invention and which operates in accordance with the method of the present invention.

With reference to FIG. 1, a ducted fan gas turbine engine generally indicated at 10 comprises, in axial flow series, a fan 11 contained within a fan duct 12, intermediate and high pressure compressors 13 and 14 respectively, a combustion system 15, high, intermediate and low pressure turbines 16, 17 and 18 respectively, and an exhaust nozzle 19.

The gas turbine engine 10 functions in the conventional manner whereby air drawn into the engine by the fan 11 is divided into two flows. The first flow is exhausted through the fan duct 12 to provide propulsive thrust. The second flow is directed into the intermediate pressure compressor 13 where compression of the air takes place. The air then passes into the high pressure compressor 14 where additional compression takes place prior to the air being directed into the combustion system 15. There the air is mixed with fuel and the mixture combusted. The resultant combustion products then expand through and thereby drive the high intermediate and low pressure turbines 16, 17 and 18 respectively before being exhausted through the nozzle 19 to provide additional propulsive thrust.

The rotary portions of the high pressure turbine 16 and compressor 14 are interconnected by a shaft 20. Similarly the intermediate pressure turbine 17 and compressor 13 are interconnected by a shaft 21 and the low pressure turbine 18 and the fan 11 by a shaft 22. The shafts 20, 21 and 22 are concentric and transmit drive from the turbine sections 16, 17 and 18 to the compression sections 11, 13 and 14 respectively.

The ducted fan gas turbine engine 10 is operationally mounted on an aircraft by conventional means (not shown). Inevitably during the operation of the engine 10, it will be required to operate in climatic conditions in which water is present in the air drawn into the engine 10 by the fan 11. That water can be in the form of vapour, in which case it has little effect upon the operation of the engine 10. However it can also be in liquid droplet form, that is rain, or in the form of frozen droplets, that is hail, sleet or snow.

Under most operating conditions the engine 10 is usually capable of operating satisfactorily when it has ingested liquid droplets or frozen droplets of water. As soon as air enters the compression system 11, 13 and 14 it increases in temperature as it is compressed. This rapidly melts the frozen droplets and vaporizes the resultant liquid droplets. As a result, the air which is finally exhausted from the high pressure compressor 14 contains substantially no water in liquid form. Consequently when the air enters the combustion system 15, there is virtually no liquid water in the air to have a prejudicial effect upon the combustion process taking place within the combustion system 15.

However if the gas turbine engine 10 is operating at minimum idle, which occurs during the descent of the aircraft prior to its landing, the compression system 11, 13 and 14 is operating at a low rotational speed. Consequently it is sometimes not capable of vaporizing all of the liquid water prior to the air carrying that water being delivered to the combustion system 15. This may happen, for instance, during very heavy rainfall.

If liquid water does enter the combustion system 15, there is a danger that it could extinguish the combustion process taking place within the combustion system 15.

Figure 2:
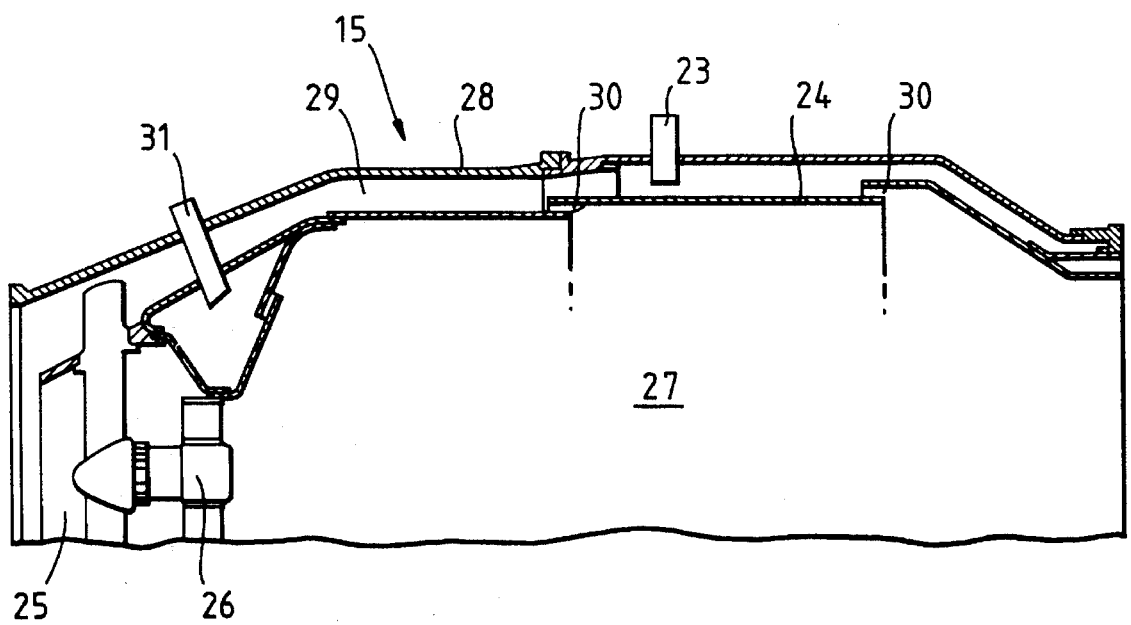
FIG. 2 is a sectioned side view of a portion of the combustion system of the ducted fan gas turbine engine shown in FIG. 1.

In order to detect the presence of liquid water in air which has been exhausted from the compression system 11, 13, 14 a thermocouple 23, which can be seen in FIG. 2, is provided adjacent the combustion system 15.

The combustion system 15 is of generally conventional configuration comprising an annular combustion chamber 24 having a plurality of air inlets 25 at its upstream end. A fuel injector 26 is provided in each air inlet 25 to direct fuel into the combustion chamber interior 27 where the combustion process takes place.

The combustion chamber 24 is surrounded in radially spaced apart relationship by part 28 of the casing of the engine 10. The thermocouple 23, which is one of a total of three such thermocouples, is located in the casing part 28 so as to protrude into the annular space 29 defined between the casing part 28 and the combustion chamber 24. The remaining two thermocouples (not shown) are similarly located to protrude into the annular space 29 so that all three thermocouples are equally circumferentially spaced apart from each other.

The thermocouples 23 measure the temperature of the air which operationally flows through the annular space 29 in order to provide cooling of the combustion chamber 24. Apertures 30 in the combustion chamber 24 wall permit air from the space 29 to flow into the combustion chamber interior 27 to provide further cooling and to take part in the combustion process.

The air which flows into the annular space 29 is part of the air flow exhausted from the high pressure compressor 14 and most of it flows into the combustion chamber 24 through its apertures 30. The remainder of the air flow flows, as previously stated, into the combustion chamber 24 through its upstream end air inlets 25. Consequently the air flowing through the annular space 29 is representative, in terms of temperature, of the air flowing into the combustion chamber 24.

We have observed that there is a direct relationship between the temperature of the air exhausted from the high pressure compressor 14 and the presence of liquid water droplets in that air. Essentially when liquid water droplets are present in the air, the temperature of the air and water mixture falls to the saturation temperature for the particular mixture. There is, therefore, a direct relationship between the measured temperature of the air and water mixture exhausted from the high pressure compressor 14 and the liquid water content of that air. Consequently, the output signals from the thermocouples 23 are directly related in magnitude to the liquid water content of the air which is about to enter the combustion chamber 24.

Figure 3:
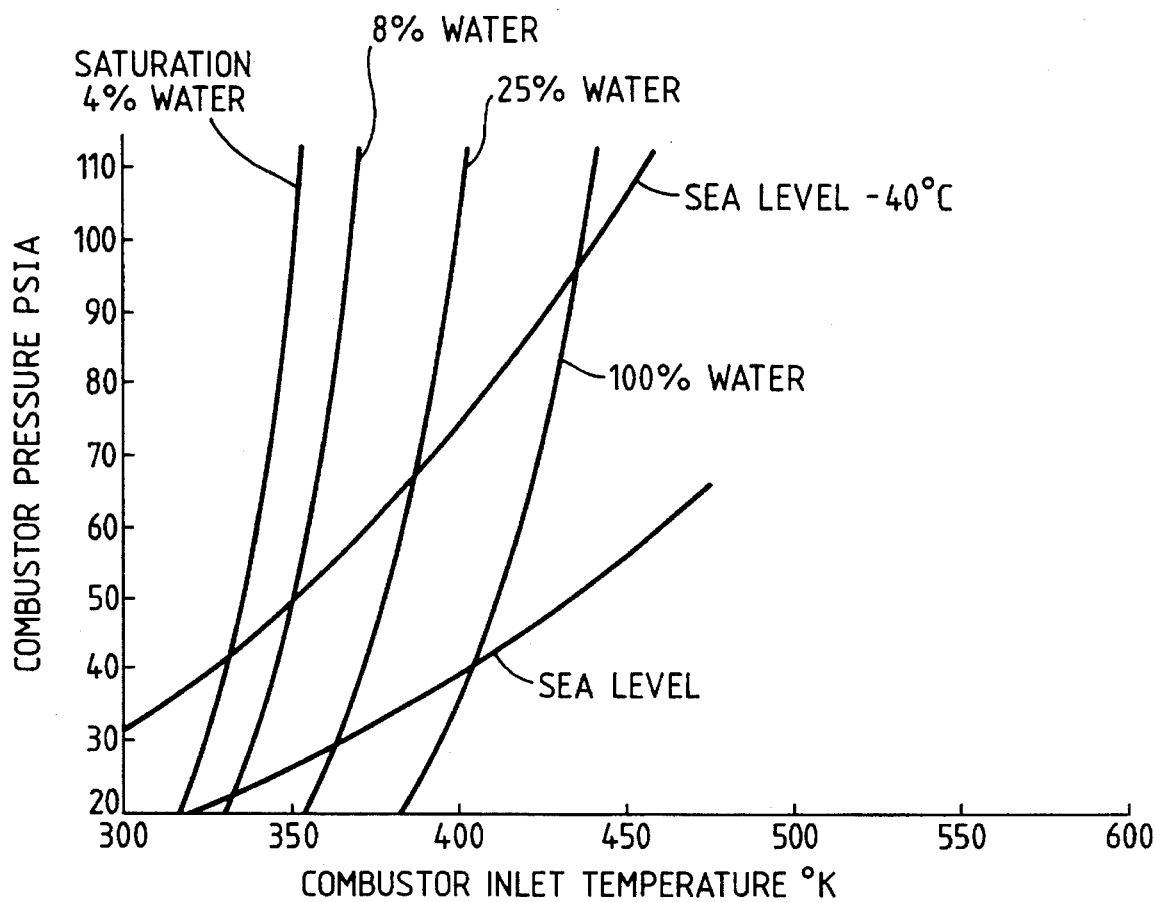
FIG. 3 is a graph showing the effects of the liquid water content of air on the measured inlet temperature and pressure of the combustion system shown in FIG. 2.

The amount of liquid water which the combustion chamber 24 can tolerate without mal-functioning is related to the pressure within the combustion chamber 24 as well as the its air inlet temperature as can be seen from the chart shown in FIG. 3. Thus for a given combustion chamber 24 internal pressure, there is a minimum air inlet temperature above which combustion can be satisfactorily sustained.

Figure 4:
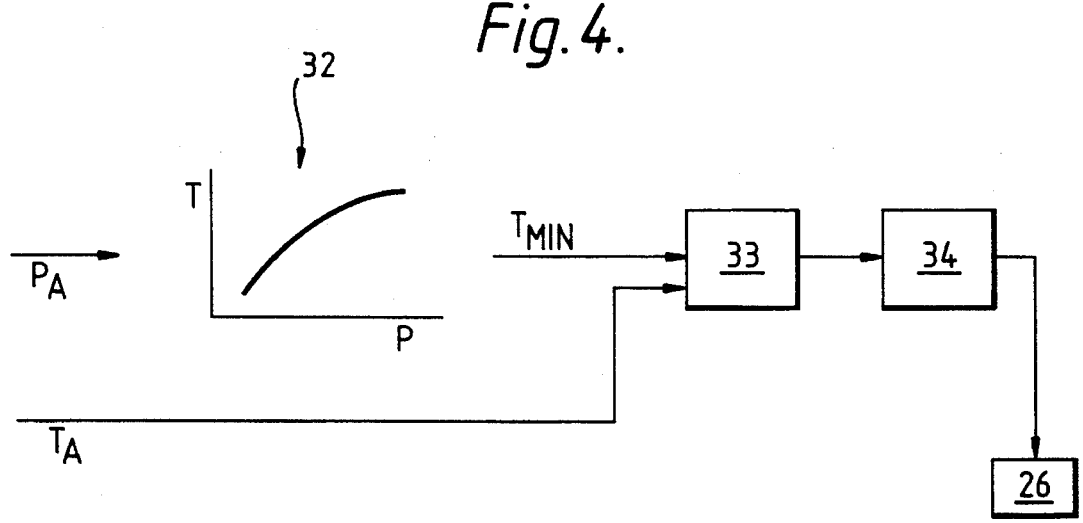
FIG. 4 is a schematic diagram of part of the fuel control system of the ducted fan gas turbine engine shown in FIG. 1.

The pressure within the combustion chamber 24 is determined by a series of pressure transducers, one of which 31 can be seen in FIG. 2, which are located at the upstream end of the combustion chamber 24. Signals from the pressure transducers 31, designated PA in FIG. 4, are directed to a device 32 which is programmed with the relationship between combustion chamber air inlet temperature T and combustor internal pressure P for a water and air mixture which is acceptable for satisfactory combustion within the combustion chamber 24. That device 32 then provides an output signal $T_{MIN}$ which is the minimum acceptable temperature for the air entering the combustion chamber 24 to support effective combustion. The signal $T_{MIN}$ is then fed into a comparitor 33 which compares the $T_{MIN}$ signal with actual temperature $T_A$ of the air entering the combustion chamber 24 as measured by the thermocouples 23. If $T_A$ is greater than $T_{MIN}$ then no further action is taken. However if $T_A$ is less than $T_{MIN}$ then an output signal is directed to the main engine electronic control unit 34. That unit controls, inter alia the fuel flow to the fuel injectors 26. If the control unit 34 receives a signal indicating that $T_A$ is less than $T_{MIN}$, it provides a command which results in the fuel flow to the fuel injectors 26 being increased.

The increased fuel flow to the fuel injectors 26 increases the speed of the engine 10 which in turn increases the speed of the compression systems 11, 13 and 14. This has two effects. Firstly the rotational speed of the fan 11 increases, thereby centrifuging more of the liquid and frozen water entering the engine 10 into the fan duct 12 and away from the intermediate pressure compressor 13. Secondly, the temperature of the air within the intermediate and high pressure compressors 13 and 14 increases, thereby vaporizing liquid water carried by the air.

The various parameters of the control system depicted generally in FIG. 4 are chosen such that the increase in fuel flow to the fuel injectors 26 is sufficient to result in substantially complete vaporization of liquid water within the compression system 11, 13 and 14. Consequently the air which is eventually exhausted from the high pressure compressor 14 is substantially free of liquid water. This, of course, results in the temperature $T_A$ as detected by the thermocouples 23 rising so that the control system depicted in FIG. 4 receives confirmation of the absence of liquid water in the air.

The low levels of combustion chamber 24 pressure $P_A$ which could give rise to difficulties of combustion system 15 operation conditions are likely to occur at minimum idle. Consequently if the engine 10 is operating at that time in heavy rain, hail or snow, the temperature $T_A$ could fall to levels low enough to trigger the operation of the control system depicted in FIG. 4. The control system would then ensure that operation of the engine 10 is sustained.

Although in the present invention, the presence of liquid water in air exhausted from the compression system 11, 13 and 14 is indicated by the output signals from the thermocouples 23, it will be appreciated that other means for detection could be employed if so desired. For instance there is a relationship between the pressure within the combustion chamber 24 and the fuel flow to the injectors 26. That pressure is influenced by the liquid water content of the air entering the combustion chamber 24. Consequently monitoring the pressure and ensuring, by fuel flow control, that it remains above the relevant value, ensures in turn that liquid water does not enter the combustion chamber 24.

It may, in certain circumstances be desirable to implement additional measures to ensure that the engine 10 continues to function effectively when it ingests large quantities of water. This is particularly so if the high pressure compressor 14 has a tendency to surge when large quantities of airborne water pass through it. Under these circumstances, it may be desirable to provide the high pressure compressor 14, or indeed the intermediate pressure compressor 13, with bleed valves 35 (if bleed valves are not already present). When the thermocouples 23 indicate that liquid water is present in air exhausted from the high pressure compressor 14, the bleed valves 35 are opened. This is in addition to the increase in fuel supply to the fuel injectors 26 described earlier. The opening of the bleed valves 35 brings about two effects. Firstly some of the liquid water passing through the compressors in question escapes through the bleed valves, thereby reducing the amount of water which is finally exhausted from the high pressure compressor 14. Secondly bleeding air from the compressors 13 and 14 improves their surge margins. As stated earlier, the presence of liquid water in compressors tends to reduce their surge margins as work is done to vaporize the water. Bleeding air from the compressors restores the surge margins, thereby making the compressors less liable to surge.

I claim:

1. A method of operating a gas turbine engine which includes an air compression system and a combustion system, during the ingestion of water-laden air by said air compression system comprising the steps of detecting the presence of liquid water in air exhausted from said compression system and at least increasing the fuel supply to said combustion system in accordance with the detection of such liquid water to increase the rotational speed of said engine and hence of said compression system to an extent sufficient to ensure that the majority of liquid water within said compression system is vaporized thereby prior to the exhaustion of said water laden air from said compression system into said combustion system, said method further including measuring the pressure within said combustion system, the measured value of the pressure being used to compute the minimum acceptable value for the temperature of the air and water mixture exhausted from said compression system into said combustion system consistent with the satisfactory operation of said combustion system, from a pre-determined relationship between said pressure and temperature, said fuel supply to said combustion system being increased in the event of the measured temperature being less than said computed temperature.

2. A method of operating a gas turbine engine as claimed in claim 1 wherein the detection of the presence of liquid water in air exhausted from said compression system is achieved by the measurement of the temperature of the air and water mixture exhausted from said compression system into said combustion system.

3. A method of operating a gas turbine engine as claimed in claim 1 wherein said compression system is provided with bleed valves, said bleed valves being opened simultaneously with said increase in fuel supply to said combustion system to bleed air from said 4. A gas turbine engine including a compression system, a combustion system and means adapted to detect the presence of liquid water in air exhausted from said compression system into said combustion system, control means being provided to control the supply of fuel to said combustion system in accordance with the output of said detector means so that in the event of liquid water being so detected, the fuel supply to said combustion system is increased to increase the rotational speed of said engine and hence of said compression system to an extent sufficient to ensure that the majority of liquid water within said compression system is vaporized thereby prior to the exhaustion of said water laden air from said compression system into said combustion system, said engine further including means to compute from the output signal of pressure sensing means, a minimum acceptable value for the temperature of the air exhausted from said compression system into said combustion system consistent with the satisfactory operation of said combustion system, from a pre-determined relationship between said pressure and temperature, said control means being adapted to increase said fuel supply to said combustion system in the event of the measured temperature being less than said computed temperature. compressor.

5. A gas turbine engine as claimed in claim 4 wherein said detector means is a temperature sensor.

6. A gas turbine engine as claimed in claim 5 wherein said temperature sensor is a thermocouple.

7. A gas turbine engine as claimed in claim 4 wherein said compressor system is provided with a plurality of bleed valves, said control means being adapted to simultaneously open said bleed valves to bleed air from said compressor system with said increase in fuel supply to said combustion system.

8. A gas turbine engine as claimed in claim 4 wherein said engine is a ducted fan gas turbine engine.

9. A gas turbine engine as claimed in claim 7 wherein said bleed valves are situated in the high pressure section of said compressor system.

* * * * *